July 7, 1970     E. R. DOREMUS ET AL     3,519,014
VALVE WITH STOP
Filed July 7, 1965
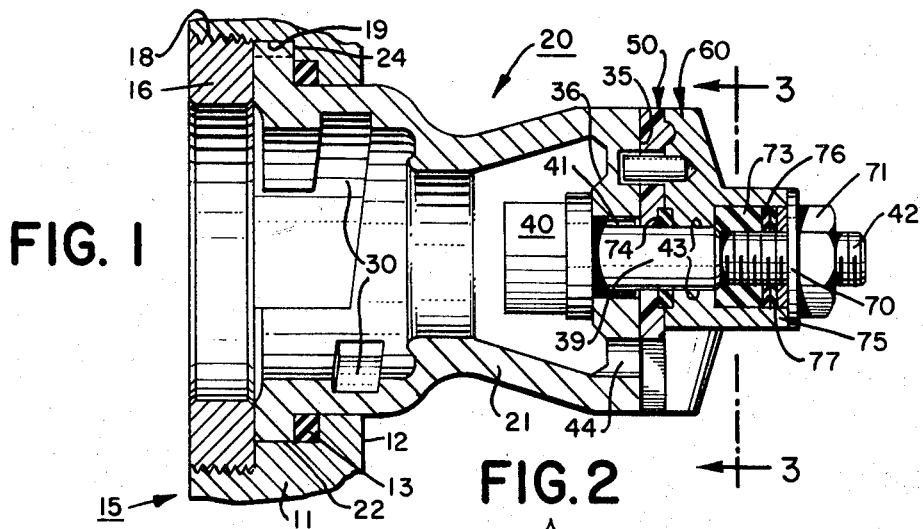
FIG. 1
FIG. 2
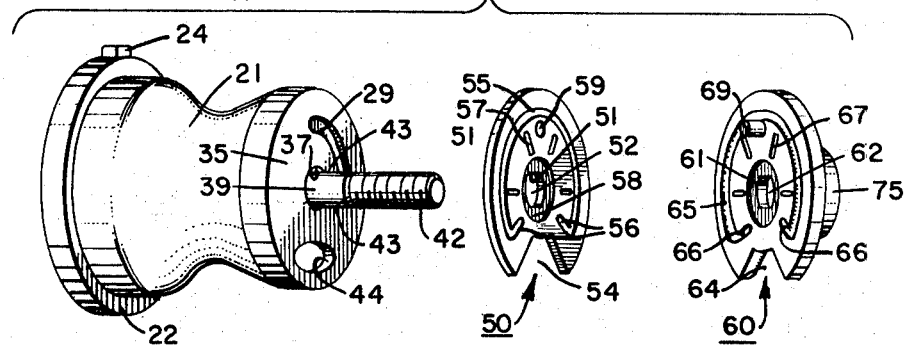
FIG. 3
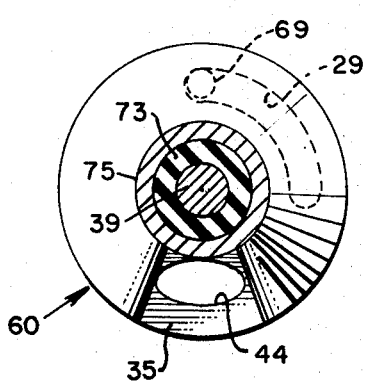
FIG. 5
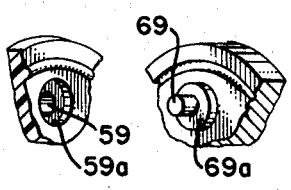
FIG. 4
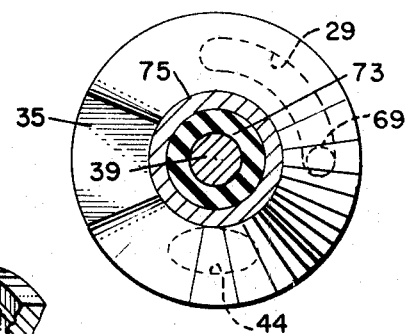
INVENTORS
R. ELLSWORTH DOREMUS
RICHARD E. DOREMUS
BY *Darby & Darby*
ATTORNEYS

United States Patent Office 3,519,014
Patented July 7, 1970

3,519,014
VALVE WITH STOP
R. Ellsworth Doremus, Clifton, and Richard E. Doremus, Upper Montclair, N.J., assignors to Golden Gate Manufacturing Company, a corporation of New Jersey
Filed July 7, 1965, Ser. No. 470,086
Int. Cl. F16k 35/10
U.S. Cl. 137—323                            10 Claims

ABSTRACT OF THE DISCLOSURE

A valve having a body and an end wall with a port and a valve member for opening and closing said port by rotation through a limited arc of movement. A cooperating structure is provided to permit the valve member to be assembled only with one orientation relative to the body so that the opening and closing of the port is assured as the valve member is rotated through its limited arc.

---

This invention relates to valves and more particularly valves for use in a system for dispensing liquids from a keg or barrel.

One widely adopted system for dispensing fluids, such as beer, from a keg is known as the Golden Gate system. This system utilizes a first fitting in a wall of the keg which is connected to a source of pressurized gas and a normally closed fill opening in the keg side wall. The keg is also provided with a tapping valve preferably oriented in a predetermined manner in the keg side wall and located adjacent the keg bottom wall. The tapping valve is formed to accommodate a tapping device which is locked to the valve by rotational movement in a first direction. This first movement, if in the proper direction, opens the valve to permit dispensing of the beer from the keg under pressure of the gas. Rotation of the tapping device in a second direction closes the valve and disengages the tapping device.

The present invention is directed to an improved tapping valve for use in a fluid dispensing system of the general type described above. In accordance with the invention, a valve is provided having a mechanical stop therein to limit rotational travel of a valve member which opens and closes the valve outlet port. The stop is arranged in such a manner so that the operator can readily turn the valve member to fully open and close the valve port irrespective of the orientation of the valve with respect to the keg. The stop arrangement also makes it impossible to assemble the various components of the valve incorrectly.

In accordance with the invention the stop arrangement is provided by forming the normally rotatable valve member which opens and closes the valve outlet port with a post which extends down into a groove or slot of predetermined shape in the end face of the valve body. The post and groove are formed in a manner to limit rotation of the valve member to a predetermined degree with respect to the outlet port of the valve so that a positive indication is provided when the port is fully opened and closed. The stop arrangement of the present invention also provides an additional positive drive engagement point between the valve member and a valve seat which is used between the valve member and the valve body.

It is therefore an object of the present invention to provide an improved valve having an arrangement for limiting the rotation of the valve member.

A further object is to provide a valve having a stop mechanism formed by a post on the valve member engaging the walls of a slot of predetermined shape in the valve body.

An additional object is to provide a valve having a stop arrangement located within the active valve sealing area and providing interengaging means on the valve member and seat to prevent fluid from entering this area.

Another object is to provide a valve having a post on the valve member and a mating slot on the valve body, the post and slot being located with respect to the valve outlet port so that a positive indication is provided of two positions corresponding to full opening and full closing of the port.

Other objects and advantages of the present invention will become more apparent upon reference to the following specification and annexed drawings, in which:

FIG. 1 is a side elevational view taken in cross section of a valve made in accordance with the present invention and also showing a cross-section of a portion of the keg to which the valve is attached;

FIG. 2 is an exploded perspective view of portions of the valve of FIG. 1;

FIGS. 3 and 4 are top plan views, taken partially in section, showing the full open and closed positions of the valve; and FIG. 5 is an exploded perspective view of the seat and valve member of another embodiment of the invention.

Referring to FIGS. 1–4, the tapping valve 20 of the present invention has a hollow main body portion or barrel 21 formed with a ring flange 22 at one end thereof. The body 21 may be formed by any suitable process, such as casting. Flange 22 fits within a sleeve 11 and flange 12 on the barrel or keg 15 to which the valve is attached. Only a portion of the barrel 15 is shown in FIG. 1 and the other details of the tapping system are omitted since they do not form a part of the invention. A sealing washer 13 of any suitable material, such as rubber for example, is placed between barrel flange 12 and valve flange 22. Valve 20 is held within the keg 15 by a locking ring 16 screwed into mating threads 18 on the sleeve 11 of the keg wall and engaging flange 22.

An outwardly extending tab 24 is provided on the valve flange 22 for mating with a groove 19 in the keg sleeve 11. The tab and groove serve to properly align or orient the valve 20 with respect to the walls of keg 15 so that a tapping device (not shown) may be readily inserted with its spigot pointing in a predetermined direction. The interior of the portion of the valve body 21 adjacent flange 22 is formed with a pair of half threads 30 to accommodate the mating threads of the tapping device.

The end of body 21 opposite flange 22 termniates in an end wall 35 whose upper surface is substantially flat. A hole 37 is formed in end wall 35 to accommodate a rotatable spindle or stem 39 which has a threaded end 42 passing therethrough. The other end of spindle 39 has a polygonal, or otherwise keyed head 40, located within the hollow interior of the valve body 21. The keyed head 40 is usually fully symmetrical and it is adapted to mate with a correspondingly keyed member on the tapping device which turns the spindle 39 as the tapping device is rotated into and out of threads 30. A shoulder 41 on the spindle fits within a boss 36 on the valve body to give axial support to the spindle.

A port 44 is also formed in the end wall 35 which communicates with the interior of the body 21. While port 44 is illustrated as being generally elliptic, it also can have other shapes. The contents of the keg are emptied through port 44 when the valve is open.

A pair of flats 43 are formed on the spindle 39 to key the corresponding flats 51 and 61 in the respective central holes 52 and 62 of a valve seat 50 and a valve member or butt 60. Both the seat 50 and butt 60 are formed with corresponding open sections 54 and 64 which are aligned when the seat and butt are mounted correctly on the spindle 39. Rotation of spindle 39 in one direction or the other either closes port 44 by placing seat 50 and butt 60 thereover, or opens the port by bringing sections 54 and 64 into alignment with the port. The details of the adjacent faces of the seat and butt and the manner by which they are held and driven together as the spindle rotates is described in detail below.

The seat 50 and butt 60 are held to the spindle 39 and the seat is brought into sealing engagement with the outer surface of end wall 35 by a washer 70 and nut 71 screwed down against the upper extension 75 of butt 60. A packing washer 73 is also provided to seal the screw threaded end 42 of the spindle. Washer 73 is held within a recess on the upper extension of the butt by an O-ring 76 and a washer 77. Nut 71 is tightened down on threads 42 only to a degree sufficient to permit rotation of seat 50 and valve member 60 with respect to the valve end wall 35.

To fasten the seat and butt together, the lower face of the butt 60 is formed with a depression or groove 65 which has the same general arcuate or circular contour as the outer edge of member 60. Groove 65 also has two end portions 66 which extend inwardly from the ends of the arcuate portion of the groove and lie generally parallel to the inwardly sloping sides of cutout section 64. A number of raised ribs or spokes 67 are also provided on the lower face of the butt and these extend radially in the area between the central hole 62 and the groove 65.

The seat 50 has a raised rib 55 of the same shape as the groove 65 and a number of small grooves or spokes 57 extending radially from the central hole 52 within the area between the hole and raised rib 55. Rib 55 also has two inwardly extending portions 56 corresponding to groove 66 on the butt. The raised rib 55 and the grooves 57 on the seat 50 mate with the corresponding groove 65 and raised ribs 67 on the valve member 60 so that the two devices are held together and rotated as a single unit as the spindle 39 is turned. An O-ring 74 is placed around the spindle between the mating faces of the seat and butt to provide a seal for the respective holes 52 and 62. An annular depression 58 (FIG. 2) is provided in the face of seat 50 to accommodate all or a portion of the thickness of the O-ring.

It should be understood, of course, that the reverse fastening arrangement can be used so that the rib 55 and grooves 57 on the seat can have a groove and ribs respectively, while the groove 65 and ribs 67 on the butt can have a rib and grooves respectively.

The face of seat 50 opposite the rib 55 is made substantially flat and smooth so that a good bearing and sealing surface is provided between the rotatable seat and the outer face of end wall 35. Seat 50 is preferably made of "nylon" or "Teflon" which can be readily molded to have the desired grooves and/or ribs for fastening to the butt. This material is also preferred for sanitary purposes since it does not deteriorate into pieces which can lodge in the keg.

One important feature of the present invention is the provision of an arrangement for limiting the rotation of the seat 50 and valve 60. This includes an arcuate shaped slot or groove 29 in the end wall 35 of the body and a post 69 which extends downwardly from the lower face of butt 60 through a hole 59 in the seat 50 into the slot 29.

Post 69 is preferably cast as part of the butt 60 although it can be attached thereto by any suitable arrangement. As can be seen, the engagement of post 69 with the end walls of groove 29 limits the rotation of the valve member 60 and seat 50 to the arc described by the slot.

The groove 29 preferably has an arc substantially equal to or slightly greater than that needed to rotate the valve 60 an amount to fully open and close port 44 in the end wall. In the preferred embodiment of the invention shown, this is approximately 90°. Groove 29 is shown having its closest portion about 90° from the port 44. It should be understood that the shape, size and location of groove 29 is not to be limited to that shown, as long as the groove selected is capable of limiting the rotation of seat 50 and butt 60 while at the same time permitting the full opening and closing of port 44.

As explained previously and as shown most clearly in FIGS. 3 and 4, the groove 29 has an arc of about 90°. In operation, this arc is sufficient so that when the stem 39 is turned 90° by the tapping device the aligned open sections 54 and 64 of the seat and valve member are brought into alignment with port 44 so that there is free passage of the liquid in the keg to the interior of the valve body and out through the tapping device. When the tapping device rotates the stem 39 90° in the other direction, the port 44 is closed by the seat covering it. The valve member 60 being on top of the seat provides a good seal for the port.

The mechanical stop or rotation limiting arrangement provided by the post 69 and mating groove or slot 29 has several advantages. These are explained below.

In using valves of the type shown in FIGS. 1 through 4 the tab 24 sometimes becomes worn so that the positive alignment of the valve to the keg provided by the tab with the keg slot 19 is no longer available. When this occurs it becomes possible to insert the valve in the keg in such a manner so that the user would not know in which way to insert and turn the tapping device to rotate the stem 39 to open the port 44. Once the tapping device is inserted incorrectly it becomes possible to rotate valve 60 and seat 50 in a direction so that instead of opening the port 44 as desired, the valve 60 would be moved in a direction to keep the port closed, or moved an amount only sufficient to partially open port 44. This, of course, is very annoying to the operator and wasteful in time. Also, if the faulty positioning of valve 60 is not detected promptly, it raises doubts as to whether or not the other portions of the tapping system are functioning properly.

By using the groove 29 and post 69 arrangement shown, improper positioning of valve member 60 is not possible no matter what the orientation of the valve with respect to the keg since rotation of the valve member and seat 50 are limited to the arc provided by the groove. The operator can always determine whether he is at one extreme of rotation of member 60 or the other and he knows that at one of them the port 44 is fully opened and at the other fully closed. To state it another way, the post and groove limit the travel of the valve member to approximately 90° thereby providing only two positions for the valve member 50 with respect to the port 44 so that the port readily can be either completely opened or closed no matter in what position the valve body is located with respect to the keg.

Another advantage of the post and groove can be realized by referring to FIG. 2 where it is shown that the stem 39, seat 50 and the valve member 60 have corresponding flat keg portions 43, 51 and 61. Because of this it is possible during assembly of the valve to mount either the seat or valve member on the stem 180° from the position which it should occupy. The use of the post 69 on the valve member 60 extending through the hole 59 in the seat 50 prevents this, since there is only one possible orientation of the ports 39, 50 and 60 by which the post on the valve member can fit through the hole in the seat and also extend into the slot 29. This orientation correctly aligns the seat and butt with respect to each other and with respect to the port 44. Consequently, the post permits positive and foolproof assembly of the various components of the valve.

It should also be understood that the use of the post 69 on the valve member and the mating hole 59 in the seat, with the post extending into the groove 29 on the end face 35, can also provide an additional positive drive point between the seat and valve member. By making the hole 59 and the post have an engaging fit, the post 69, in addition to the interlocking ribs and spokes on the seat and butt, can aid in driving the seat as the stem is rotated.

As should be clear, the use of the mating grooves and raised ribs and spoke grooves and ribs for the valve member 60 and seat 50 also provide a seal so that the fluid contents in the keg cannot leak into the space between the valve member 60 and the seat 50. A barrier or seal is provided by the mating raised rib 55 and groove 65 which is generally of the same overall configuration as the outer configuration of the valve member. Consequently, the liquid in the keg encounters this barrier and cannot pass through to the stem 39.

In a preferred embodiment, the hole 59 for post 69 is preferably located in the area of the seal between raised rib 55 and the center hole 52. This aids in preventing fluid from leaking into the hole 59 since it is blocked by the mating raised rib and groove.

FIG. 5 shows another arrangement for further sealing the hole 59. Here, an annular depression 59a is formed around hole 59 and a raised shoulder 69a is provided around post 69. The shoulder fits into the annular depression to form a seal. This also enhances the locking and driving relationship of the seat and valve member.

It should be understood that the stop arrangement of the valve of the present invention is located completely within the confines of the valve body and no visible exterior parts are provided. Thus, the valve does not occupy any additional space.

What is claimed is:

1. A valve for dispensing liquid contents from a container comprising:
   a valve body (21) having one open end, the other end thereof having an end wall (35) formed with a port (44) through which liquid is passed and another opening (37) for a spindle (39) to pass therethrough, said valve adapted to be mounted with said end wall within said container and with said open end accessible from outside of said container to a valve actuating device having at least one extending tab,
   a rotatable spindle (39) having an end passing through said end wall opening and having keyed means (40) on its other end for engagement by a mating keyed means on the valve actuating device.
   a valve member (60) having a fluid flow opening (64) therein mounted on said one end of said spindle,
   aligning means on the portion (43) of said spindle extending beyond said end wall (35) and the valve member (61) for positioning said valve member on said spindle for rotation therewith as a unit,
   threaded means (30) on said body for engagement by the tab of the valve actuating device which in cooperation with the keying means on the spindle permits insertion of the actuating device into said body in only one orientation and limits the rotation of said spindle and valve member units (39, 60) by said actuating device to an arc of substantially only 90° and only in a first direction when the actuating member is inserted into the valve body between first and second predetermined positions at which the end wall port is respectively closed and open, the flow opening (64) of said valve (60) being brought into alignment with said end wall port (44) as said spindle is rotated in the first direction from said first to said second predetermined positions, the withdrawal of said actuating means upon rotation in a second direction opposite to said first direction also being limited to said arc of substantially 90° by said threaded means so that now said valve (60) closes the end wall port (44) when said spindle is rotated in said direction opposite to said first direction from said second to said first predetermined position, and
   cooperating means (29, 69) on said body and said unit separate from said thread means (30) for further limiting the rotation of said unit by said actuating device to said arc of substantially only 90° which includes traversal of said first and second predetermined positons by the flow opening or the valve as the sipndle is rotated in said first direction.

2. A valve as set forth in claim 1 wherein said cooperating means comprise an arcuate shaped wall defining a slot formed on one of the opposing surfaces of said end wall and said valve member and a post extending into said slot formed on the other surface.

3. A valve as set forth in claim 2 wherein said body has only a single port, said wall forming the slot being formed on the body end wall and said post being carried by said valve member.

4. A valve as set forth in claim 1 further comprising a seat interposed between said valve member and the end wall, said seat formed with an opening, and means for holding said seat to said valve member with the openings thereof aligned as said valve member is rotated.

5. A valve member as set forth in claim 4 wherein said cooperating means comprise an arcuate shaped wall defining a slot formed on one of the opposing surfaces of said end wall and said valve member and a post extending into said slot formed on the other surface, and said post extends through said seat.

6. A valve as set forth in claim 4 wherein said means for holding the seat to the valve member comprises a raised rib and a mating depressed groove on the opposing faces of the valve member and seat, said rib and groove having the same general shape as the outer contour of the valve member.

7. A valve as set forth in claim 1 wherein the valve body end wall has only a single port.

8. A valve as in claim 1 wherein said aligning means on the spindle and the valve permits said valve member to be positioned on the spindle at two positions, and said cooperating means on said body and said unit permits the valve to be positioned on said spindle for rotation therewith as a unit only in one of said two positions.

9. A valve as set forth in claim 8 wherein said cooperating means comprise an arcuate shaped wall defining a slot formed on one of the opposing surfaces of said end wall and said valve member and a post extending into said slot formed on the other surface.

10. A valve as in claim 9 wherein said aligning means comprises a pair of flats on each of said spindle and valve member, said flats of each pair spaced substantially 180° apart.

References Cited

UNITED STATES PATENTS

| 1,315,741 | 9/1919 | Pranold | 251—287 |
| 2,583,869 | 1/1952 | Monson | 251—291 X |
| 2,992,654 | 7/1961 | Doremus et al. | 137—323 |

ALAN COHAN, Primary Examiner

D. R. MATTHEWS, Assistant Examiner

U.S. Cl. X.R.

251—287, 339